United States Patent
Finley

(10) Patent No.: US 7,830,362 B2
(45) Date of Patent: Nov. 9, 2010

(54) LASER AND DIGITAL CAMERA COMPUTER POINTER DEVICE SYSTEM

(76) Inventor: Michael Cain Finley, 3860 Saint Elisabeth Sq., Atlanta, GA (US) 30096

( * ) Notice: Subject to any disclaimer, the term of this patent is extended or adjusted under 35 U.S.C. 154(b) by 2352 days.

(21) Appl. No.: 10/187,728

(22) Filed: Jul. 2, 2002

(65) Prior Publication Data
US 2003/0052859 A1 Mar. 20, 2003

Related U.S. Application Data

(60) Provisional application No. 60/302,693, filed on Jul. 5, 2001.

(51) Int. Cl.
G09G 5/08 (2006.01)
(52) U.S. Cl. .......... 345/157; 345/156; 345/158
(58) Field of Classification Search ......... 345/156–158, 345/179–183
See application file for complete search history.

(56) References Cited

U.S. PATENT DOCUMENTS

| | | | |
|---|---|---|---|
| 4,280,135 A | 7/1981 | Schlossberg | |
| 4,808,980 A | 2/1989 | Drumm | |
| 5,138,304 A | 8/1992 | Bronson | |
| 5,528,263 A | 6/1996 | Platzker | |
| 6,292,171 B1 * | 9/2001 | Fu et al. | 345/156 |
| 6,346,933 B1 * | 2/2002 | Lin | 345/157 |
| 6,377,242 B1 * | 4/2002 | Sweed | 345/158 |
| 6,704,000 B2 * | 3/2004 | Carpenter | 345/158 |
| 2001/0028341 A1 * | 10/2001 | Kitazawa | 345/156 |
| 2002/0011987 A1 * | 1/2002 | Kitazawa | 345/156 |
| 2003/0011566 A1 * | 1/2003 | Gomi et al. | 345/157 |

OTHER PUBLICATIONS

Richard R. Eckert, Jason A. Moore "The Classroom of the 21st Century: The Interactive Learning Wall"—SIGCHI Bulletin, vol. 32, No. 2—Apr. 2000.
Richard R. Eckert, Jason A. Moore "An Interactive Remote-Controlled Computer Projection System for Use in a Large Classroom Environment" www.es.binghamton.edu/~reckert/ietedoc.html.
Michael Wissen "Implementation of a Laser Based Interaction Technique for Projection Screens" ERCIM News No. 46, Jul. 2001.
Travis Printer "Lightmouse: The Ultimate Presentation Tool" www.presentersuniversity.com/courses/show_deskills.cfm?RecordID=191.

* cited by examiner

*Primary Examiner*—Alexander Eisen
*Assistant Examiner*—Stuart McCommas

(57) ABSTRACT

The present invention defines a system wherein a computer with an attached image capture camera can receive control signals from a user based on analysis of the captured images. Specifically, the user is interacting with the standard display output of the computer via a LASER pointer and these interactions are detected by analysis software modules operating on the captured images. These analysis modules use a series of algorithms to determine the intention of the user's LASER position and motion such as the intent to perform the equivalent of a standard mouse pointer device click, trace out a standard glyph representing a letter, or a custom input as determined by independent application software.

8 Claims, 2 Drawing Sheets

Physical Block Diagram of a possible configuration of the Invention

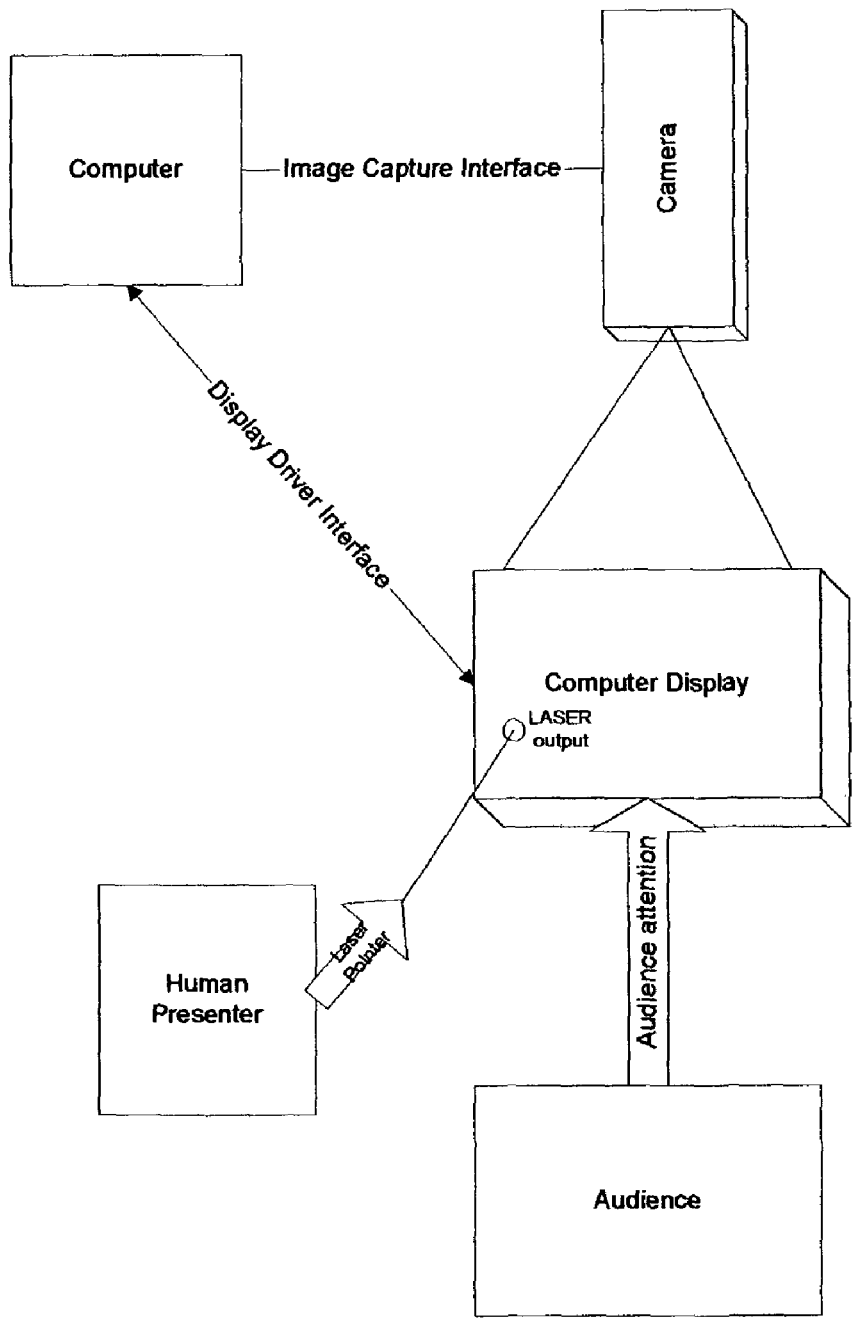
Figure 1. Physical Block Diagram of a possible configuration of the Invention

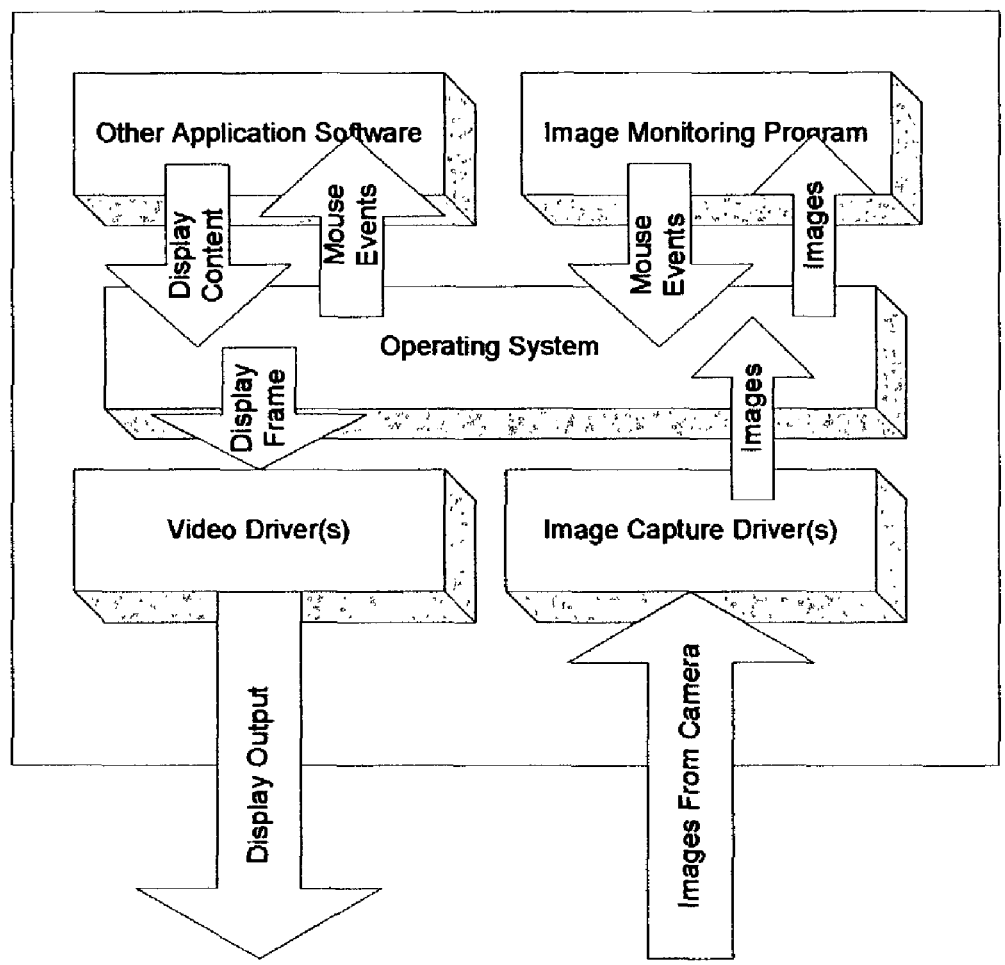

LASER AND DIGITAL CAMERA COMPUTER POINTER DEVICE SYSTEM

CROSS-REFERENCE TO RELATED APPLICATIONS

This application claims domestic priority of provisional application No. 60/302,693 filed Jul. 5, 2001 by Michael Cain Finley (same inventor) which is titled "Camera and image analysis software human interface system" and beginning with the sentence: "A personal computer with an attached digital camera acquires images in near real time."

STATEMENT REGARDING FEDERALLY SPONSORED RESEARCH OR DEVELOPMENT

Not Applicable

REFERENCE TO COMPACT DISK APPENDIX

Not Applicable

BACKGROUND OF THE INVENTION

This invention relates to the field of machine vision, human-computer interfaces and computer peripherals.

Interaction between a human and a computer has taken many forms over time, including early punch cards and leading all the way to modern graphical user interfaces. The GUI or Graphical User Interface has become a standard and the associated pointer device which allows a user to achieve computer actions through selections of the GUI has become a standard along with it. This pointer device takes the form of a computer mouse, light pen, track ball, touch screen, digitizer pad, and other technologies known in the art.

Human to human communication can take advantage of a GUI. A person who creates a media presentation through the computer's display can better communicate a thought or topic with another person or group of persons. Evidence of this is clear in a medium such as the world wide web which essentially allows one party to prepare media content for communication with another party. Similarly, computer-assisted education has become a favorite of corporations and universities who need to distribute a lot of information to a large group in a short time.

Another common use of technology for communication is the combination of a human and computer screen in a presentation being delivered to one or more people. Software programs commercially available from corporations and individuals other than the creators of the present invention are dedicated to this express purpose and provide varying degrees of animation, sound and diverse media that can be used by a human presenter to augment or enhance the communicated presentation that would otherwise be provided by the human alone. This is essentially the automation of a task previously performed through "transparencies" or "foils" presented using an "overhead" projector as known in the art. Common uses of these tools today include sales presentations, education and training presentations, status briefings—virtually any situation in which the presenter deems it is needed. In fact, this practice has lead to wide availability of complementary hardware technologies, such as computer projectors which replace or augment the computer's normal display with an enlarged "screen" that can be viewed by a wider audience.

When a human presenter is addressing an audience while showing a computer-generated media sequence, the human should have some control over the computer—such as what to show and when. In one sense, the timing of the presentation could be worked out in advance and essentially "choreographed" so that human and computer are always presenting related information. This proves difficult because of the expense of creating such presentations (many rehearsals needed, memorization time for the human) and the inflexibility of the result. Similarly, a second human presenter could monitor the first presenter and essentially "drive" the computer. This is expensive and unfeasible in a number of scenarios where it is simply not possible to provide two presenters, such as a standard classroom or sales presentation. The most common solution is for the human presenter to distract his or her attention from the presentation momentarily and direct it at governing a change in the sequence of events presented by the computer as needed to complement what the human is expressing.

Commercial software programs allow for this interaction to take place through the computer's standard pointer device or computer keyboard. A number of manufacturers have created devices that allow the pointer to function wirelessly so that the presenter is free to move around as is typical in presentations. These devices include gyroscopic motion detectors, wireless track-balls, and others. No single solution has become widespread in its adoption.

A parallel problem faced by a human presenter as a series of media is displayed to a group is drawing attention to specific portions of the media as each portion is discussed. In a scenario where rich content is displayed, including graphics, text, animation, etc. on a single screen and while the presenter speaks and answers questions, it is often necessary to highlight specific aspects of the media presentation in order to provide guidance to the audience. Features on a graph, specific words or text messages, etc. that are present on the media display can be emphasized or highlighted in order to add to the experience, enhancing attention and therefore retention of the message. Unlike the problem of controlling the computer system, this parallel problem of audience guidance has a nearly ubiquitous solution in the form of the LASER pointer. This inexpensive device replaces a "pointer stick" as was used previously and essentially allows the presenter to easily place a point of distinctively shaped, brilliant or colored light overlaid with the media presentation at will. Simple gestures can then turn in to an underline effect, a circle around a target feature, etc. This process is very simple and highly effective as the speaker/presenter merely has to aim a hand-operated pen-sized LASER as are inexpensive and commonly commercially available.

The problem of controlling the computer presentation in tandem with providing audience guidance has been addressed in the art. To this extent it has been identified as a distinct problem whose solution would be useful. It has been evident to a number of inventors that some combination of the LASER pointer and the computer control should result in a solution.

Bronson in U.S. Pat. No. 5,138,304 from 1992 discloses a "PROJECTED IMAGE LIGHT PEN." Bronson's invention uses a camera to observe a projected computer screen, looking for differences between the camera input and the computer's video memory "frame buffer." These differences are then analyzed to determine where the laser pointer is currently aimed, and from that information control signals to the computer are generated. Bronson's first disadvantage is that the method does not allow for detection of motion of the laser pointer over time, such as would be required to allow the presenter complex control signals. Examples of such control signals include shapes as in letters for input or glyphs representing arrow keys. More specifically, Bronson's invention is only capable of detecting point targets rather than other geometrical forms variable in time or space.

Bronson's invention also fails to provide control signals generated by laser pointer interaction with off-screen items such as fixed position "buttons" that a user might choose to display permanently. Examples include a periodic chart that is on the wall of a classroom or standard Forward/Stop/Backward "VCR" controls for animations. If these items are not on the computer screen (because they are physically drawn on the projection surface or in the surrounding environment) then they cannot be detected by comparing video memory, as Bronson suggests, to anything because they are not stored in video memory as part of the video presentation. Other composite video applications that change the computer's display output without affecting the video frame buffer would cause technical difficulties that Bronson does not overcome. These include such applications as on-screen display that is commonly used to provide screen and sound adjustments as well as video playback that is the result of a hardware-decoded stream of digital video data placed directly into display output without changing video memory as is common in the art.

Furthermore, Bronson does not disclose the use of a networked peripheral camera such as a VMEBus camera which was known in the art at the time of disclosure. This omission detracts significantly from the commercial viability of Bronson's solution as it makes the required hardware more complex, less portable not modular for adaptation of ever more modern sensor devices. For this reason, Bronson's system is unusable in laptop computers void of frame-grabbing hardware expansion interfaces.

Bronson's largest disadvantage is the digital signal processing intensity that is required to implement the solution in the embodiment claimed. Because the algorithm relies on instantaneous differences between the video frame buffer and the input from a camera, every camera frame must be converted into pixel coordinates. This is a per-pixel multi-floating-point computation which requires several steps and grows in complexity as the quality desired increases. In order to provide adequate response time, Bronson's algorithm is likely to use most of the CPU cycles for the system on which it is run even taking into account advances for the foreseeable future.

Wissen in "ERCIM News" No. 46, July 2001, discloses "Implementation of a Laser Based Interaction Technique for Projection Screens." Wissen requires a specialized computer system and three video cameras. Furthermore, the display implemented is a specialized type and the described system is not adaptable to standardized PC products. For these reasons it is not a feasible solution for mass market applications that require a single camera on a PC hardware platform Platzker in U.S. Pat. No. 5,528,263 from 1996 discloses an invention "INTERACTIVE PROJECTED VIDEO IMAGE DISPLAY SYSTEM." Platzker references light based systems such as Bronson but does not disclose an invention using them. Rather Platzker implements a system in which the presenter's body or body parts act as cues to the computer system by overlapping with portions of a projected display. This requires that the screen be within reach of the presenter and is disadvantageous in that it is distracting to the audience for the presenter to turn away from the them in order to see the presented image and move to occlude portions of it. Platzker does not sort out the problem of shadows created by the presenter without intent to obstruct but which would trigger control signals spuriously. Platzker's greatest disadvantage is that the invention requires predetermined screen regions containing control characteristics. This does not allow for gesture recognition or for free-form input to the computer's pointer device interface so that any software package can act on the control signals or for different controls signals based on the same input but at different times. Aside from these faults, Platzker, as Bronson, requires dedicated video expansion hardware to capture camera input rather than working from a networked camera.

IC Technologies manufactures a commercial product, LightMouse, comprising a camera that monitors the movement of a laser pointer and provides click controls. A distinct disadvantage of this product is the requirement that the camera "see" the entire projected display in order to properly calibrate and function. This is a debilitating weakness in an environment where the projection screen being monitored is slightly smaller than the projected image, as occurs frequently when configuring portable displays in the field. Furthermore, the IC Technology solution is unable to provide control signal inputs for activities outside the field of view of the camera, a weakness shared with others of the solutions discussed. Even once it is working, the tool is only able to provide mouse-like inputs to the computer system and is otherwise un-programmable and limited in its use. LightMouse algorithms are not sufficiently robust and it will "manufacture" a laser pointer even if one is not on the field of vision. Its algorithms also do not account for the realities of speed of a human driving a pointer, as detected mouse coordinates may jump hundreds of pixels back and forth many times a second. LightMouse also requires the user to tweak the camera parameters to highly specific contrast, brightness, and saturation settings. This is a distinct disadvantage to a device that will be used by a board user group with varying degree of technical expertise.

Richard R. Echert and Jason A. Moore discuss "AN INTERACTIVE, REMOTE-CONTROLLED COMPUTER PROJECTION SYSTEM FOR USE IN A LARGE CLASSROOM ENVIRONMENT" www.cs.binghamton.edu/-reckert/icLedoc.html, and "The Classroom of the 21st Century: The Interactive Learning Wall"—SIGCHI Bulletin, Volume 32, Number 2—April 2000. This disclosure targets remote learning as embodied in presenters in one location addressing audiences in a separate physical location. To this extent, the disclosure requires a fixed geometry environment including a rear-projection system with a camera mounted as close to the projection source as possible in order to function. These are limitations that render the solution impractical for traveling or portable applications, or for all but the largest presentation forums. These limitations are due to intolerance of operator shadows overlapping the projected image, a common occurrence in practice. A restriction shared with other elements of the art is the presence of a perpetually visible window on the screen which is necessary for this device to function. The presence of this window overlays the presentation material that is being delivered by a user of this system, distracting the audience. Most detracting in this disclosure is the use of a single statistic—the brightness of relative camera input pixels—to detect a laser input. This limitation makes many assumptions about the environment including contents of the presenter's material, which cannot contain points as bright as the laser. This is particularly debilitating when a CCD camera is in use, which by nature of the sensor has low saturation and therefore high sensitivity. In addition the system is not likely to work in bright lighting conditions that would decrease the contrast acquired by the camera. An effect as simple as a decrease in the battery charge of the presenter's hand held pointer would incapacitate the system disclosed.

Drumm in U.S. Pat. No. 4,808,980 discloses an invention "ELECTRONIC LIGHT POINTER FOR A PROJECTION MONITOR." Drumm's solution scales-up in size the standard raster-scan detection process of a desktop light-pen. This requires significant hardware complexity such as high speed electronics that are not commonly available in the consumer market space. This disadvantage is in addition to the fact that the presenter using Drumm's solution has to position a physical device at the right location in a projector's output light stream. The later requires that the presenter have a pole or a ladder proportional in size to the projection screen such that the light-pen sensor can be positioned. Clearly the configuration is neither convenient nor portable and represents a cumbersome distraction to the audience.

Schlossberg in U.S. Pat. No. 4,280,135 discloses an invention "REMOTE POINTING SYSTEM" which orients and triggers a remote laser based on a local one seen through a camera. Schlossberg solves a problem similar to Echert and Moore relating to a presenter that is a separate physical location from the audience. Schlossberg, however monitors the movement of a laser pointer with a camera device and transmits the position and activity information to a remote system where it can be reproduced. The remote system contains a second laser and a mechanical orientation transducer which are provided with the presentation activity information to re-create the pointer presence that is observed by the camera. This invention does not provide control information to the presentation computer system, and in fact does not assume that a computer is even in use for the presentation. It has no applicability to local presentation scenarios as its usefulness stems from the ability to send information remotely. It is an enhancement to the presenter's person to person capability without addressing the parallel heretofore unsolved problem of presenter control over the computer media presentation.

BRIEF SUMMARY OF THE INVENTION

The present invention describes a system, method and apparatus enabling the control of a media presentation through the use of a LASER pointer. The invention is further generalized to include other forms of light-based pointer devices, and to include other control functions than guiding a media presentation.

A personal computer with an attached digital camera acquires images in near real time as is common in inexpensive commercial consumer-oriented cameras or "webcams." A monitoring software program that is also running on the computer or on an attached networked computer processes the individual images and compares them successively to detect laser pointer activity in the camera's field of view. The camera is pointed generally in the direction of the computer's screen which is any display device common in the art such as a CRT monitor, LCD panel monitor or a projection of the computer's screen contents. A human who is viewing the contents of the screen uses a laser pointer to identity information on the computer display that is relevant to a desired action. The camera software monitoring program identifies the location or the laser pointer's light on the displayed image and thus determines a pixel location on the display that is being referenced. Using this information, the software program creates a PC control signal such as a mouse click event and signals the operating system with this control signal. Specific logic discriminates LASER actions that are intended for human viewers versus those that are intended to trigger control signals.

BRIEF DESCRIPTION OF THE SEVERAL VIEWS OF THE DRAWING

FIG. 1. Depicts one physical layout of the components of the invention such that a computer is producing a presentation for an audience, a video camera attached to the computer is monitoring the presentation, and a human presenter is interacting with the presentation by use of a LASER pointer.

FIG. 2. Depicts one embodiment of the software processes necessary to implement the invention and the interaction between these processes including display flow out of the computer, image flow into the computer, and mouse events within the computer between processes.

DETAILED DESCRIPTION OF THE INVENTION

Image resolution of the acquired sequence of digital images is not critical to the application since a rough estimate will be sufficient to produce a coordinate for the mouse click that is as accurate as a human with a mouse device would be. A calibration process prior to the presentation allows the software program to properly reverse, rotate, scale, skew and translate the coordinates from the captured digital image to the coordinates of the computer's pixels. The calibration consists of a series of preset images that the software program displays along with a request to the human user that neither the camera nor the screen be moved, and that no motion occur between the camera's sensor and the screen display during calibration.

These images allow the software program to detect the presence in the digital camera image of a number of known visual targets on the screen as it displays each known target in succession. This process enables the software program to create a series of calibration constants that mathematically link the coordinate system of the images generated by the camera with the coordinate system of the computer's pixel display. After the calibration process, the software program ceases all display activities, thus allowing other application programs to fully utilize the screen. The calibration is required once prior to each time that the camera or screen is moved. Calibration is therefore valid for a series of interactions as long as camera position and screen position have remained constant. Screen resolution changes can be automatically accomodated through linear mapping between the coordinates of the pixel reference frame at the time of calibration and the pixel reference frame at the time of live operation. If the physical display characteristics are such that the viewable area of the screen changes with different resolutions (as is the case with many CRT monitors), then a calibration will be necessary at each operative level. In the event of a calibration that does not allow the software program to detect changes in the camera image corresponding temporally and mathematically to the known set of displayed calibration images, the software program reports an error without disrupting the presentation process.

The software program can be configured to generate specific events corresponding to those normally provided by a standard PC mouse or keyboard. This is achieved by detecting more complex events triggered by the human. Motions such as a counter-clockwise or clockwise circle, a flashing dot, or a series of short and long illuminations of one point can thus communicate a complex set of actions from the human to the computer. Similarly, the software program can be configured to detect specific 'hot' zones of the image and from these pre-programmed sequences of events can be caused by the software program in other software applications that are active on the computer. For example simple "forward" and "back" invisible "hot" zones in generally unoccupied areas of the screen can be configured such that when activated by the laser pointer they result in preprogrammed activation commands that move a presentation forward or backward as the human moves through a discourse.

The software program, camera, and human can therefore interact with a number of other software applications on the computer which do not need to be prepared to work with the laser pointer system in advance. These include drawing programs, presentation tools, handwriting recognition programs, and the like. Standard capabilities of these programs including reaction to mouse clicks triggering additional presentation content, character recognition of mouse movements, etc. are therefore enabled through the use of the laser pointer rather than the mouse device. A common practice in the art is the presentation of commercial software products for training or demonstration through a projected presentation. In this case, any standard mouse-driven commercial software product can be fully controlled by the presenter through the use of the laser pointer, facilitating demonstration or instruction in its use.

The software program of the invention recognizes large changes in the camera image and does not generate events if it cannot unambiguously determine the action desired. These might include projector or camera motion due to environmental factors, shadows of passing audience members or of the presenter, large changes in ambient lighting such as are common when the lighting is changed during the course of a meeting, etc. Some events such as small changes in the camera's field of view could cause the software program to mistakenly determine that a laser event has been requested by the human. These situations are acceptable and are typically recoverable such as when a mouse or keyboard mistake is made in typing or advancing presentation content.

In a preferred embodiment of the system, a laptop computer running user installed third-party application software also has an attached USB "webcam" device, the drivers required by the manufacturer for the webcam and a software program designed per the present invention. A human presenter, prior to the commencement of a presentation, starts the software program of the present invention. Said program requests operating system services to retrieve a stream of digital images from the web cam. If these services are not available, a warning error is displayed and the software program of the present invention requests that the user troubleshoot the connection to the webcam, persisting in attempts to receive the stream of images until it succeeds or until the user chooses to stop the software program of the present invention. Once it is receiving a stream of data from the camera, the software program of the present invention renders and decodes the image data to form a series of bit-mapped rectangular images corresponding to the contents of the field of view of the camera.

Once the software program of the present invention is receiving images, it enters setup mode. In setup mode, the software program of the present invention displays the images acquired by the camera on the screen in a window and requests that the human user point and focus the camera manually until a maximum amount of the computer's entire display is visible in the camera image window. This is similar to the current practice of configuring projection screens prior to presentation commencement. An alternate embodiment with a motorized pan/zoom camera allows the software program of the present invention to automate this process at a much larger expense. Another option finds the camera included in the physical housing of the projector, thus taking advantage of focus and positioning that are done for the sake of the human audience.

Using the mouse, the user then clicks a button labeled "OK" on the computer screen indicating that the image is optimized. Once "OK" is pressed, The software program of the present invention enters calibration mode and displays a completely blank screen and optionally plays an audio file stating that calibration is in progress, with a count-down in seconds for the expected duration of the calibration process. The blank screen image is stored and a new image of a rectangular block of pixels in the upper-right corner of the screen is displayed. The image from the camera is again captured. The new image is subtracted pixel by pixel from the original blank screen image to form a new image known as the first calibration subtraction image. If the system is setup properly, the camera is working, etc. the first calibration subtraction image will contain mostly pixels that are near zero (allowing for signal noise in small areas) and a large area that is distinctly non-zero, corresponding to the visual result of the displaying the block of pixels in the upper right. If there is no significant non-zero group of pixels or too many areas of non-zero pixels detectable in the first calibration subtraction image, a warning is issued to the user and calibration is aborted.

Assuming the first calibration subtraction image shows a valid non-zero area, the position in camera coordinates of this area is recorded as a first calibration value. The x and y coordinates of the area in the image are treated statistically to produce a single x,y point which is stored as the upper-right calibration point in a matrix. The software program of the present invention then begins a process of blanking the computer display, placing a rectangular block of pixels at a new location on the screen, capturing an image from the camera, subtracting the image from the blank screen display image originally captured and detecting a corresponding area of non-zero pixels in each subtraction image.

Thus a calibration x,y is created that maps the field of view of the camera to corresponding screen coordinates for every block displayed. In order to produce a coarse resolution in this calibration mapping, only a few such images will be required in, for example, the upper right, upper left, lower right and lower left of the screen. For a more accurate calibration, more images will be required. If the projection screen surface has irregularities such as "jogs," textures, designs, etc. then a more fine calibration will be required.

Configuration settings in the software program of the present invention allow the user to determine how to choose between expediency of calibration and accuracy. Well known techniques in the art also allow for the use of specialized patterns to determine at once a large number of calibration points with varying degrees of tradeoff between ambiguity, accuracy and expediency. A number of modes in the software system of the invention would allow a user to choose the most optimal calibration means for the given need.

Once a satisfactory calibration process is complete, The software program of the present invention displays a message confirming that calibration is done and displays an "OK—please disable the camera until presentation starts" box for the user to press. The camera can be disabled electrically, by a physical lens cover or external obstruction. Once OK is pressed, The software program of the present invention restores the screen display and enters Operational Mode. At this point the user covers the camera's sensor, causing The software program of the present invention to receive a blank sequence of images. Alternatively, the user can select a preference where Operational Mode is activated by a special sequence form the laser pointer, such as a clockwise circle encompassing a track over the majority of the screen. When the software program of the present invention recognized the pattern, it would pop-up a message box for a few seconds indicating that mouse tracking is on. This preference removes the need to block the camera.

The user then begins the process of running presentation software programs. When prepared to begin the interaction, the user re-enables the camera and begins presenting. The software program of the present invention running in Operational Mode monitors the image acquired by the camera. The monitoring process in operational mode is divided into three distinct phases. A number of individualized algorithms analyze the camera image using statistical, historical and comparative methods. These algorithms constitute the micro-algorithm phase, which provides a series of candidate target points as inputs to the next phase, Macro-Algorithm. During the macro-algorithm phase, the results of various micro-algorithms are considered and combined to make a best-judgement determination of what the laser pointer is doing. Once determination is made at the macro-algorithm level, the process of mapping and event determination results in control signals to the computer and external software programs.

The micro-algorithm phase comprises distinct analysis processes which are independent from each other, though they are operating on the same source information from the camera. Several key processes are identified here though it is clear that additional processes known in the art of image processing could be applied in tandem with these without loss of the generality of the invention:

Same-image absolute detection of primary-color intense region: in this algorithm, the image is analyzed for extreme brightness in the color spectrum selected by the user. Helium-Neon LASER devices produce a distinctive red frequency, for example, which is inexpensive to generate and is therefore pervasive in the art. Additional devices produce more exotic colorations and these too can be selected by the user for isolation in this algorithm. Because various cameras will acquire colors with varying degrees of fidelity, it is not possible to monitor the input image for a specific frequency value unless the laser and camera can be calibrated together in advance. This, however, is not necessary because the image can be analyzed for primary color intensity in red, blue and green which allows large fluctuations in quality of acquired image to still result in identification of the LASER.

Same-image absolute detection of brightness: in this algorithm, the image is analyzed using a peculiar characteristic of the charge-coupled detector (CCD) devices that are common and inexpensive and therefore found in most inexpensive cameras. These CCD light detectors become saturated by intense lighting such as generated by a LASER point, resulting in a spot on the digitized image that is bright white rather than showing the color of the actual laser. Locating these intense points of brightness can therefore provide an additional source of information about the activity of the laser.

Same-image relative detection of brightness: in this algorithm, the invention takes advantage of the fact that for the laser pointer to be meaningful to the audience, it must stand out in contrast to the background presentation. Therefore the image is analyzed statistically to determine a background absolute brightness level and subsequently point targets distinctly above this background level are detected.

Inter-image Jitter: in this algorithm, the invention exploits a known phenomenon in a novel way. It is known that a human subject, when pointing a device such as video camera or LASER pointer will introduce small-scale motion even when the intent is to hold it steady. Typically this motion is a nuisance and is discarded by commercial video equipment through a feature knows as "motion compensation." In the case of a LASER pointer, the human-introduced motion is also present and causes the LASER light of the pointer to move slightly or jitter. By tracking objects between frames of camera input that appear to have this characteristic, the invention detects by yet another means the targets in the images that are likely intended by the presenter.

The Jitter algorithm is more specifically described as a comparison of each pair of sequential images, say n and n+1, followed by n+1 and n+2 and so on. First a difference image is created wherein each pixel in the difference image is the subtraction of the corresponding pixels in the sequential images. Then this difference image is viewed by examining every possible contiguous X by X pixel region, where X is preferred to be 8. The pixels in the difference image within the region being considered are first added using signed arithmetic, then they are added using unsigned or absolute value arithmetic. The two numbers, signed sum and absolute sum, are then taken as a ratio with the signed sum as a denominator. If this ratio is above a threshold, then jitter is said to be detected in this region and so a target point is fed into the macro algorithm. The process works because if the X by X region happens to contain the various positions of the pointer at a given jitter event, then the sequential difference image will contain more than one non-zero point. If these points cancel-out in the signed-difference summation then it is likely that the same object was seen in both images but in different positions so the denominator of the ratio becomes small and therefore the ratio becomes large. The unsigned numerator controls the ratio in the case of very small pixel variations that are likely to be camera noise or other ambient aberrations.

The Macro-Algorithm phase takes place once each of the micro-algorithms have produced a list of candidate target points. The macro-phase correlates the targets produced by each algorithm, providing each with a weighting factor or importance to the outcome that is based on conditions detected during the calibration process such as intense ambient lighting, size of the computer screen in the camera field of view, etc. The correlated target points are further refined by comparison of the macro-algorithm results from previous image frames taking into account the physical constraints of a human presenter guiding the laser. Targets that are thought to be moving can be discriminated by comparing prior frames. Targets thought to be bright can be compared to similar targets in prior frames and so forth.

Once a properly selected laser target is promoted by the macro-algorithm phase, the detected targets must be converted into a control signal for the presentation computer. This process starts with mapping of the coordinates of activity in the camera reference frame to the computer display pixel reference frame. This occurs by location in the calibration matrix of coordinates most closely resembling the event coordinate pair and interpolation to the precise point from there. Four calibration zone points are defined as those surrounding the active target point. These points are determined by first finding the row of calibration values whose y coordinates are closest to the event pair but not greater, called the upper row. The next row is called the lower row. A column of calibration points called the left column is located by finding the column with x coordinates nearest the event pair's x value and a right column is determined to be the next column after the left. The four points (left, upper), (left, lower), (right, lower) and (right, upper) are determined to be the calibration points. The event coordinate pair is used to determine an approximate location of the screen event relative to the calibration points and the corresponding interpolation is used to translate the event coordinate pair into a screen event coordinate pair. Alternatively more sophisticated mathematical transformations map the event coordinate pair to the most optimal screen coordinate in well known topological transformations.

In the event that the video resolution has changed from the time that the calibration was performed, the system automatically scales its calibration linearly along X and Y axes to accommodate the change.

The screen event coordinate pair is then used as the x,y coordinates of a mouse event which is posted to a pattern recognition algorithm. If the screen event coordinate pair is undefined because upper, lower, right or left columns are undefined (event coordinates outside of calibration values) then no event is posted.

The pattern recognition algorithm can be configured in advance for several modes. In one mode, it simply passes the coordinates of the events received directly to the operating system where they can be dispatched to other software applications as mouse events. In another mode, the points are passed through a filter that looks for handwriting characters. when it has been detected that the user has created handwritten character with the laser pointer, this character is posted to the operating system, to be dispatched to other software applications as a keyboard event. Still other modes allow for recognition of gestures mapped to specialized event sequences or "macros" to the operating system. A counter-clockwise circle gesture could trigger a series of mouse and key events or other scriptable operating system capabilities, for example, software applications as mouse events. In another mode, the points are passed through a filter that looks for handwriting characters. When it has been detected that the user has created handwritten character with the laser pointer, this character is posted to the operating system, to be dispatched to other software applications as a keyboard event. Still other modes allow for recognition of gestures mapped to specialized event sequences or "macros" to the operating system. A counter-clockwise circle gesture could trigger a series of mouse and key events or other scriptable operating system capabilities, for example.

I claim:

1. A system comprising processing means, image capture means for transferring images to the processing means, display means for receiving display content from the processing means, the system comprising:

Software Modules executed by the processing means comprising:

an operating system and driver software for the processing means, image capture means and display means; and an analysis module for processing captured images and determining from them a position of a laser point within a field of view of the image capture means by a combination of a macro and micro algorithms wherein the macro-algorithm is adaptable and controls weights on likely contributions of each of the micro algorithms, the micro-algorithms include a number of different statistical and signal processing techniques which each independently analyze a camera data stream, and the analysis module further uses the position information determined from the captured images to provide control signals to the operating system or to other software modules within the processing means.

2. The system of claim 1 wherein the processing means comprises an industry standard Personal Computer such as a desktop, laptop or server PC compatible system.

3. The system of claim 2 wherein the image capture means comprises a Universal-Serial-Bus interfaced camera.

4. The system of claim 2 wherein the display means comprises a projector of the PC computer's standard output.

5. The system of claim 1 wherein the display means comprises a standard PC monitor such as CRT or LCD.

6. The system of claim 1 wherein the analysis module provides independent analysis of the images captured from four separate algorithms: Same-image absolute detection of primary-color intense region, Same-image absolute detection of brightness, Same-image relative detection of brightness, and Inter-Image Jitter.

7. The system of claim 3 wherein the display means comprises a projector of the PC computer's standard output.

8. The system of claim 7 wherein the analysis module provides independent analysis of the images captured from four separate algorithms: Same-image absolute detection of primary-color intense region, Same-image absolute detection of brightness, Same-image relative detection of brightness, and Inter-Image Jitter.

\* \* \* \* \*